US011189444B2

(12) United States Patent
Kitamura et al.

(10) Patent No.: US 11,189,444 B2
(45) Date of Patent: Nov. 30, 2021

(54) ELECTRONIC APPARATUS HAVING ILLUMINATED KEY TOPS

(71) Applicant: LENOVO (SINGAPORE) PTE. LTD., Singapore (SG)

(72) Inventors: Masahiro Kitamura, Kanagawa (JP); Takuroh Kamimura, Kanagawa (JP); Shogo Akiyama, Kanagawa (JP); Satoshi Douzono, Kanagawa (JP)

(73) Assignee: LENOVO (SINGAPORE) PTE LTD, Singapore (SG)

( * ) Notice: Subject to any disclaimer, the term of this patent is extended or adjusted under 35 U.S.C. 154(b) by 0 days.

(21) Appl. No.: 17/144,738

(22) Filed: Jan. 8, 2021

(65) Prior Publication Data

US 2021/0225603 A1    Jul. 22, 2021

(30) Foreign Application Priority Data

Jan. 9, 2020 (JP) .............................. JP2020-002247

(51) Int. Cl.
*H01H 13/00* (2006.01)
*H01H 13/83* (2006.01)
*F21V 8/00* (2006.01)

(52) U.S. Cl.
CPC ............. *H01H 13/83* (2013.01); *G02B 6/009* (2013.01); *G02B 6/0083* (2013.01); *H01H 2219/062* (2013.01)

(58) Field of Classification Search
CPC ...... G02B 6/0021; G02B 6/0086; G02B 6/88; G02B 6/93; G02B 6/95; H01H 13/83
See application file for complete search history.

(56) References Cited

U.S. PATENT DOCUMENTS

| 8,592,702 | B2* | 11/2013 | Tsai ..................... G06F 3/0219 200/311 |
| 10,147,569 | B1* | 12/2018 | Huang .................. H01H 13/83 |
| 2008/0225508 | A1* | 9/2008 | Liu ........................ H01H 13/83 362/23.03 |
| 2010/0097246 | A1* | 4/2010 | Watanabe ............ G06F 3/0202 341/22 |
| 2011/0048908 | A1* | 3/2011 | Nishino ................. H01H 13/83 200/314 |

(Continued)

FOREIGN PATENT DOCUMENTS

JP    2012-079218 A    4/2012
JP    2019-185966 A    10/2019

*Primary Examiner* — Gerald J Sufleta, II
(74) *Attorney, Agent, or Firm* — Antony P. Ng; Russell Ng PLLC (57) ABSTRACT

An electronic apparatus having key tops that can be illuminated without cooling performance being affected is described. The electronic apparatus includes: a chassis and a keyboard device having a set of key tops; a base plate for supporting the key tops; a membrane sheet laminated on a top surface side of the base plate; a light guide plate laminated on a bottom surface side of the base plate; and a light source module for irradiating the key tops with light via the light guide plate. The keyboard device, which is located on a top surface side of the chassis, includes an inlet port for passing air in a top-bottom direction and a set of individual light sources arranged respectively on bottom surface sides of a part of the key tops that is located to overlap the inlet port.

10 Claims, 6 Drawing Sheets

LEFT ◄──────► RIGHT (56) References Cited

U.S. PATENT DOCUMENTS

| | | | |
|---|---|---|---|
| 2014/0009903 A1* | 1/2014 | Peng | G02B 6/0055 |
| | | | 362/23.03 |
| 2014/0055289 A1* | 2/2014 | Chou | H01H 13/83 |
| | | | 341/22 |
| 2014/0168934 A1* | 6/2014 | Chen | H01H 13/83 |
| | | | 362/23.03 |
| 2014/0226302 A1* | 8/2014 | Shih | H04M 1/22 |
| | | | 362/23.03 |
| 2014/0334125 A1* | 11/2014 | Yao | G02B 6/0055 |
| | | | 362/23.03 |
| 2015/0014135 A1* | 1/2015 | Ho | H01H 13/83 |
| | | | 200/5 A |
| 2015/0109757 A1* | 4/2015 | Chen | H01H 3/125 |
| | | | 362/23.03 |
| 2015/0198302 A1* | 7/2015 | Liang | H01H 9/182 |
| | | | 362/23.03 |
| 2016/0109636 A1* | 4/2016 | Weng | G02B 6/005 |
| | | | 362/23.03 |
| 2016/0189890 A1* | 6/2016 | Leong | H01H 3/125 |
| | | | 200/5 A |
| 2016/0196937 A1* | 7/2016 | Ding | H01H 13/83 |
| | | | 200/5 A |
| 2017/0186570 A1* | 6/2017 | Zou | H01H 13/023 |
| 2018/0020829 A1* | 1/2018 | Vier | G06F 1/1669 |
| | | | 345/169 |
| 2020/0388450 A1* | 12/2020 | Kitamura | G06F 3/03547 |

\* cited by examiner

ELECTRONIC APPARATUS HAVING ILLUMINATED KEY TOPS

PRIORITY CLAIM

The present application claims benefit of priority under 35 U.S.C. §§ 120, 365 to the previously filed Japanese Patent Application No. JP2020-002247 with a priority date of Jan. 9, 2020, which is incorporated by reference herein.

TECHNICAL FIELD

The present invention relates to electronic apparatuses in general, and in particular to an electronic apparatus having illuminated key tops.

BACKGROUND

An electronic apparatus, such as a laptop personal computer (laptop PC), may be equipped with a keyboard device in which key tops can be illuminated by an LED light source. The illumination can be achieved by arranging LED light sources respectively under all the key tops, which, however, increases component cost. Thus, in some laptop PCs, the keyboard device is provided with a light guide plate. Guiding light from the light source by the light guide plate allows all the key tops to be illuminated by a small number of light sources.

In a laptop PC described above, an inlet port penetrating the keyboard device from top to bottom may be provided to improve cooling efficiency in an apparatus chassis. The inlet port then penetrates a part of the light guide plate. This causes the light guide plate to be unable to guide the light in the part of the penetrating inlet port and thus unable to illuminate the key tops at such locations.

Consequently, it would be desirable to provide an electronic apparatus in which the key tops can be illuminated while a cooling function is also in place.

SUMMARY

In accordance with an embodiment of the present disclosure, an electronic apparatus includes: a chassis and a keyboard device having a set of key tops; a base plate for supporting the key tops; a membrane sheet laminated on a top surface side of the base plate; a light guide plate laminated on a bottom surface side of the base plate; and a light source module for irradiating the key tops with light via the light guide plate. The keyboard device, which is located on a top surface side of the chassis, includes an inlet port for passing air in a top-bottom direction and a set of individual light sources arranged respectively on bottom surface sides of a part of the key tops that is located to overlap the inlet port.

The above-mentioned configuration ensures high cooling performance to be achieved by the inlet port establishing communication in the top-bottom direction in the keyboard device. The individual light sources arranged respectively on the bottom surface sides of the key tops where the light guide plate is made missing due to the inlet port, which allows the electronic apparatus with the partially missing light guide plate to still illuminate all the key tops that require illumination by means of the light guide plate and the individual light sources.

All features and advantages of the present disclosure will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION

Figure 1:
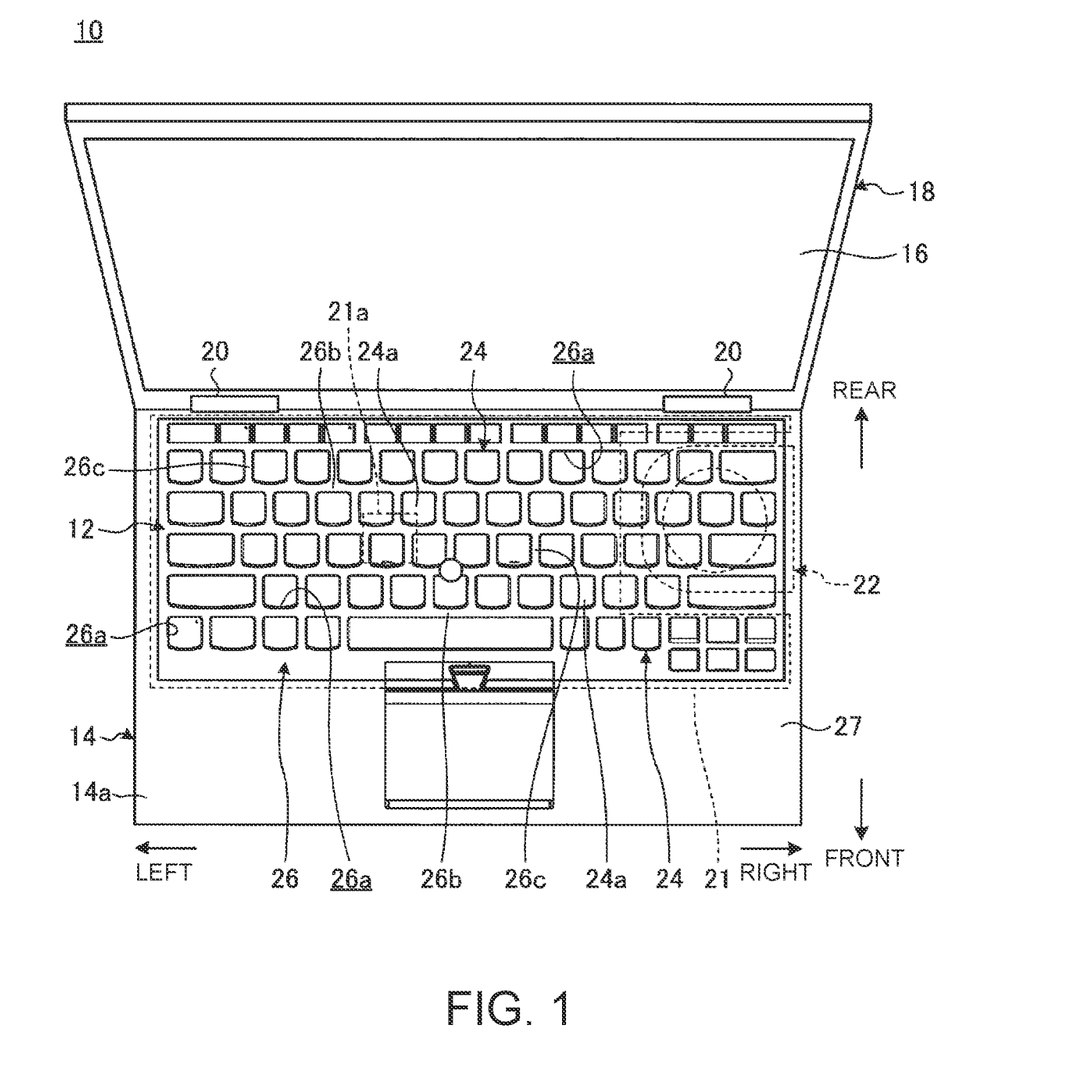
FIG. 1 is a plan view of an electronic apparatus, according to one embodiment.

FIG. 1 is a plan view of an electronic apparatus 10, according to an embodiment.

The electronic apparatus 10 includes an apparatus chassis 14 on which a keyboard device 12 is mounted and a display chassis 18 on which a display 16 is mounted. The electronic apparatus 10 is a laptop PC of a clamshell type in which the apparatus chassis 14 and the display chassis 18 are pivotally connected to each other by a hinge 20. FIG. 1 shows that the display chassis 18 has been opened from the apparatus chassis 14 into a usage form. The electronic apparatus 10 may be an electronic apparatus other than the one of the clamshell type.

In the following description of the apparatus chassis 14 and the keyboard device 12 mounted thereon, with respect to a user looking at the display 16 and using the keyboard device 12, a near side is referred to as "front," a far side as "rear," a thickness direction as "top-bottom," and a width direction as "left-right."

An electronic substrate 21 and a fan device 22 are housed in the apparatus chassis 14.

The electronic substrate 21 is a motherboard of the electronic apparatus 10, and a central processing unit (CPU) 21a and various semiconductor chips are mounted thereon. The fan device 22 is a blower fan for cooling the CPU 21a and others. Further housed in the apparatus chassis 14 are a hard disk device, a battery device and the like which are not illustrated.

The keyboard device 12 is provided on a top surface 14a of the apparatus chassis 14.

The keyboard device 12 has a plurality of key switches 24. The keyboard device 12 is of an isolation type in which peripheries of key tops 24a, which serve as operation surfaces of the key switches 24, are partitioned by a frame (isolation frame) 26.

The frame 26 is formed of resin, metal, or the like. The frame 26 is a mesh-like frame body. The frame 26 in this embodiment is integrally molded with a cover member 27 forming the top surface 14a of the apparatus chassis 14. The frame 26 may alternatively be formed separately from the cover member 27. The frame 26 has a plurality of holes 26a into which the key tops 24a are respectively inserted to be movable in a top-bottom direction. The holes 26a of the frame 26 are configured by a lateral frame portion 26b extending in a left-right direction and a vertical frame portion 26c extending in a front-rear direction.

The display chassis 18 has a display 16 on a front side thereof. The display 16 is, for example, a liquid crystal display. A bottom end of the display chassis 18 is connected to a rear end of the apparatus chassis 14 via a hinge 20.

Figure 2:
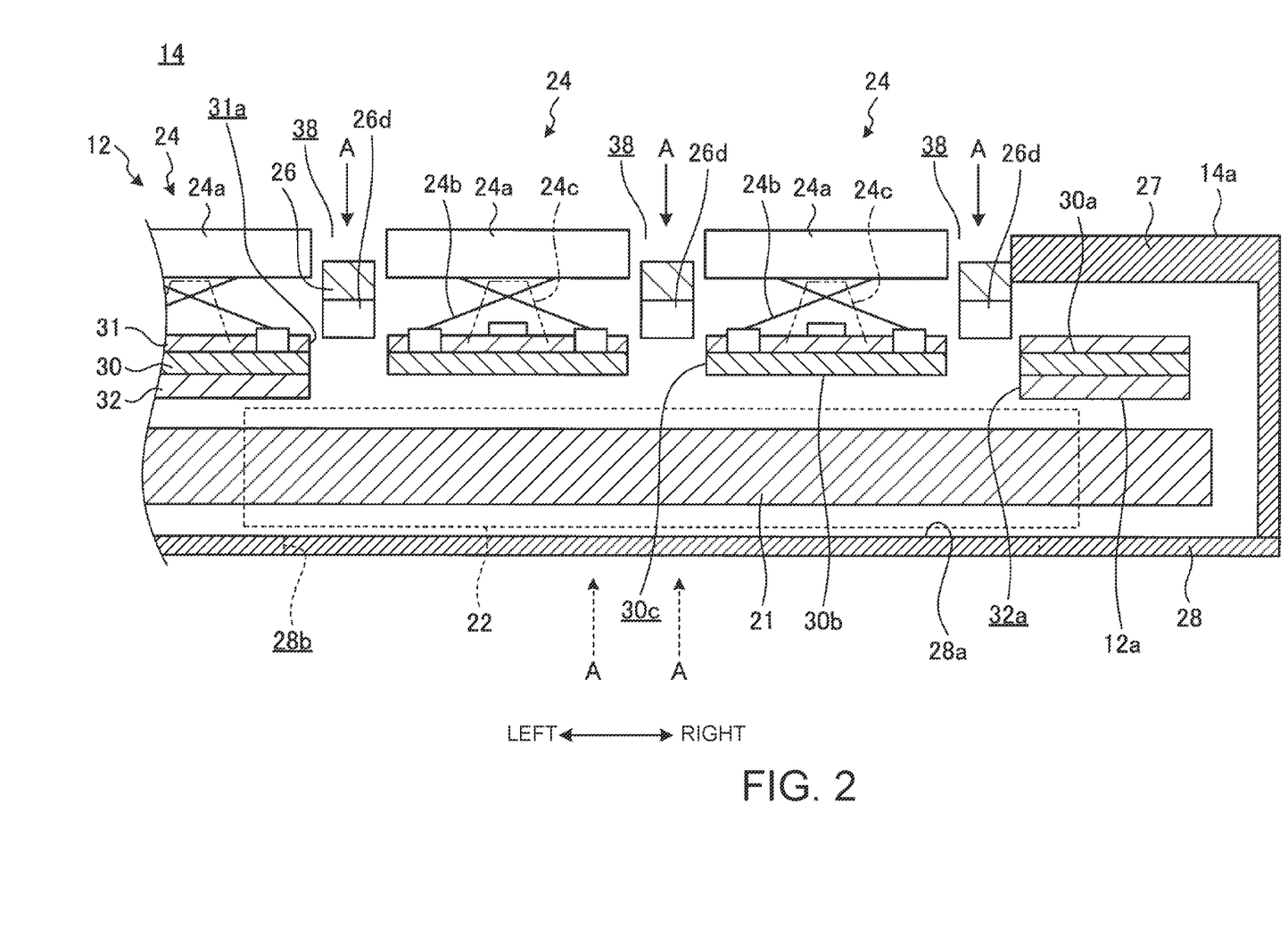
FIG. 2 is an enlarged side cross-sectional view illustrating a principle part of an internal structure of an apparatus chassis.
Figure 3:
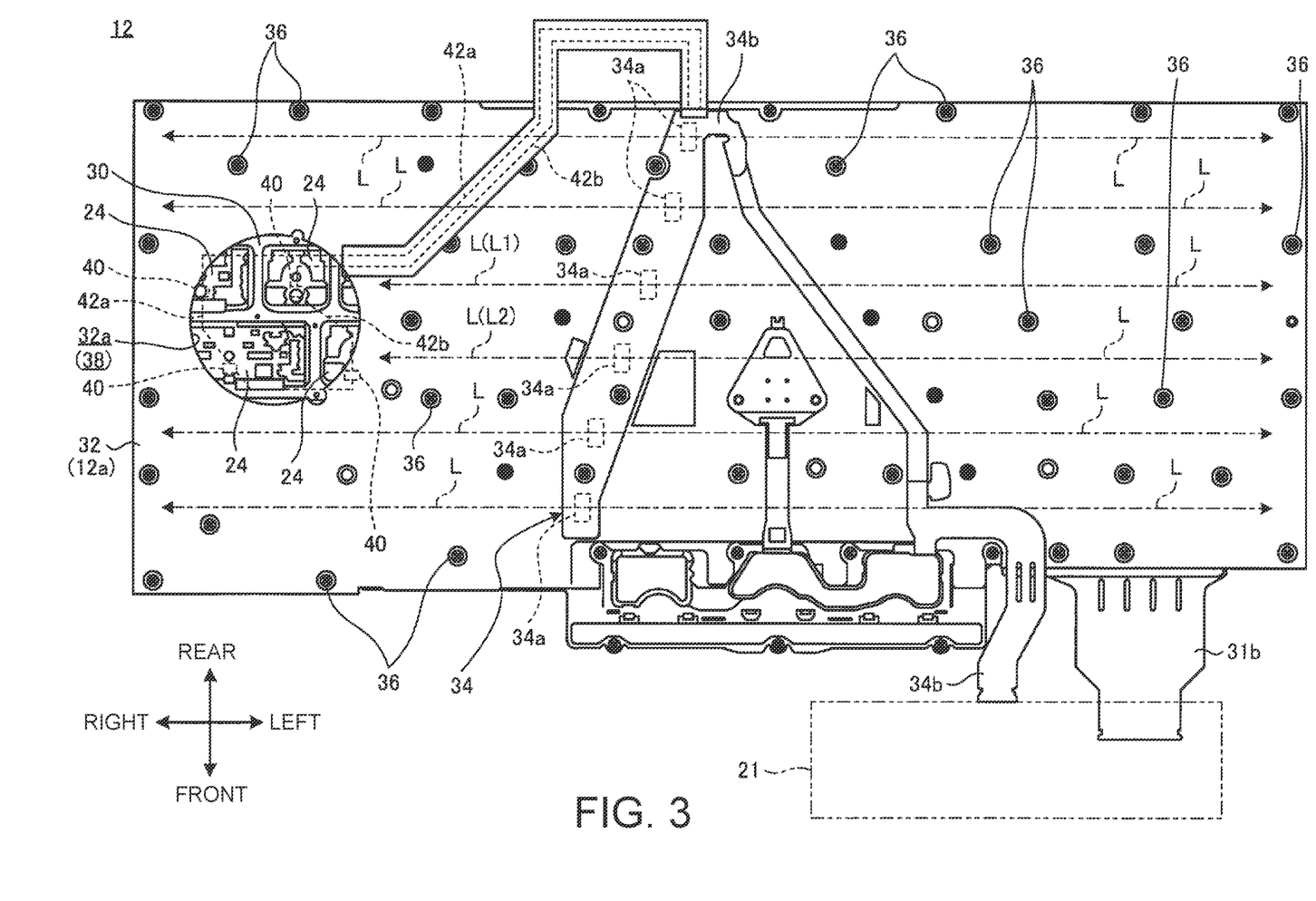
FIG. 3 is a bottom plan view of a keyboard device.

FIG. 2 is an enlarged side cross-sectional view schematically illustrating a principle part of an internal structure of the apparatus chassis 14. FIG. 3 is a bottom plan view of the keyboard device 12.

As illustrated in FIG. 2, the apparatus chassis 14 houses the electronic substrate 21 and the fan device 22 between an inner surface 28a of a bottom plate 28 and a bottom surface 12a of the keyboard device 12. The bottom plate 28 is provided with a bottom inlet port 28b in a position directly under the fan device 22. The bottom inlet port 28b is an opening for introducing air A from the bottom into the apparatus chassis 14 and is made up of a set of parallel slit-like holes, for example.

As illustrated in FIG. 2, the keyboard device 12 includes the plurality of key switches 24, a base plate 30, a membrane sheet 31 and a light guide plate 32.

Each of the key switches 24 has a key top 24a, a guide mechanism 24b and a rubber dome 24c. The guide mechanism 24b supports the key top 24a on atop surface 30a side of the base plate 30 in a movable manner in the top-bottom direction. The guide mechanism 24b is a scissor mechanism connecting a bottom surface of the key top 24a and the top surface 30a of the base plate 30. The rubber dome 24c is a dome-shaped member made of an elastic material having flexibility such as silicone rubber. The rubber dome 24c is disposed between the membrane sheet 31 and the key top 24a. The rubber dome 24c is an elastic member that pushes the membrane sheet 31 when the key top 24a is pressed down and returns the key top 24a to its original position when the press-down operation is released.

The base plate 30 is an attachment plate for the key switches 24 and the frame 26. The base plate 30 is a plate member made of thin metal such as stainless, aluminum or others provided with some cut-and-raised portions and punched portions.

The membrane sheet 31 is laminated on the top surface 30a of the base plate 30. The membrane sheet 31 is, for example, a switch sheet of three-layer structure in which contacts thereof are closed when pushed. In the membrane sheet 31, the contacts are closed by, for example, being pressed at a position where a fixed contact and a movable contact overlap each other so that the movable contact is brought into contact with the fixed contact. The membrane sheet 31 has through holes in various locations thereof through which the guide mechanism 24b and the frame 26 are supported on the top surface 30a of the base plate 30.

The light guide plate 32 is laminated on the bottom surface 30b of the base plate 30. The light guide plate 32 is a plate or a sheet made of light transmissive resin such as PET, polycarbonate, acryl, or the like. A light source module 34 is attached to the light guide plate 32 (see FIG. 3). The light source module 34 is for illuminating the key tops 24a. In an example, the light source module 34 is attached to the light guide plate 32 at a central part thereof in the left-right direction and includes a plurality of light sources 34a arranged in the front-rear direction. The light source module 34 may be connected to the electronic substrate 21 via wiring 34b formed by a flexible substrate. The respective light sources 34a may be LED elements. Light emitted from the light sources 34a is guided by the light guide plate 32 in the left-right direction so that the key tops 24a are irradiated therewith from backsides. In the keyboard device 12 of this embodiment, six rows of the key tops 24a are arranged in the front-rear direction (see FIG. 1). Six light sources 34a are arranged in the front-rear direction to be respectively overlapped by the rows of the key tops.

As illustrated in FIG. 3, the keyboard device 12 is fixed to the frame 26 by a plurality of screws 36 fastened from the bottom surface 12a toward the top surface. A reference code 31b in FIG. 3 indicates a wiring formed by a flexible substrate or the like for connecting the membrane sheet 31 to the electronic substrate 21.

As illustrated in FIG. 2, the keyboard device 12 is provided with inlet ports 38 penetrated in the top-bottom direction. Each inlet port 38 is an opening for passing air A in the keyboard device 12 in the top-bottom direction. The inlet port 38 is configured by a gap between adjacent key tops 24a and 24a, a hole 31a formed in the membrane sheet 31, a hole 30c formed in the base plate 30 and a hole 32a formed in the light guide plate 32 communicating with each other in this order from top to bottom.

There are no specific limitations to the position and number of the inlet port 38 to be provided. It is, however, preferable that the inlet port 38 is formed in a position directly above the fan device 22. In other words, the fan device 22 in this embodiment is configured to take in outside air from air intake ports formed respectively in a top surface and a bottom surface of a fan chassis by rotating blades (an impeller) and discharge the air from a side surface, just like a fan device used in a common laptop PC. Providing the inlet port 38 directly above the fan device 22 thus allows a smooth intake of the air A above the keyboard device 12.

If, on the other hand, the inlet port 38 is provided in a position other than directly above the fan device 22 (for example, in a position where the user's hand is placed for a long time during use of the keyboard device 12 such as a vicinity of an S key or a K key), the top surface of the keyboard device 12 is suppressed from becoming so hot as to cause discomfort to the user. The inlet port 38 may be provided directly above a semiconductor chip that becomes hot among those mounted on the electronic substrate 21 except the CPU 21a. For example, the inlet port may be provided directly above a solid-state drive (SSD) or the like. It is to be noted that the inlet port 38 must not disturb the functions of the light source module 34 and thus must be arranged off the light source module 34.

As illustrated in FIG. 3, the light emitted by the light sources 34a arranged in the front-rear direction are guided by the light guide plate 32 in the left-right direction (see the light L indicated by dashed-dotted lines in FIG. 3) to illuminate the key tops 24a. That is, in a plan view, the light L is guided across the vertical frame portions 26c of the frame 26 and illuminates the respective key tops 24a from the bottom.

As illustrated in FIG. 3, the hole 32a forming the inlet port 38 (the inlet port 38) is provided in a part of the light guide plate 32 in this embodiment. This hole 32a thus prevents some light L1, L2 from being guided when the light L is emitted by the respective light source 34a and guided by the light guide plate 32. As a result, the key tops 24a of the key switches 24 that are located to overlap the hole 32a and that are located downstream of the hole 32a in the light guiding direction of the light L are not illuminated or illuminated with only a small amount of light, which lowers the quality of the keyboard device 12. Thus, in the electronic apparatus 10, as illustrated in FIG. 3, individual light sources 40 are respectively provided to the key switches 24 located to overlap the hole 32a.

Figure 4:
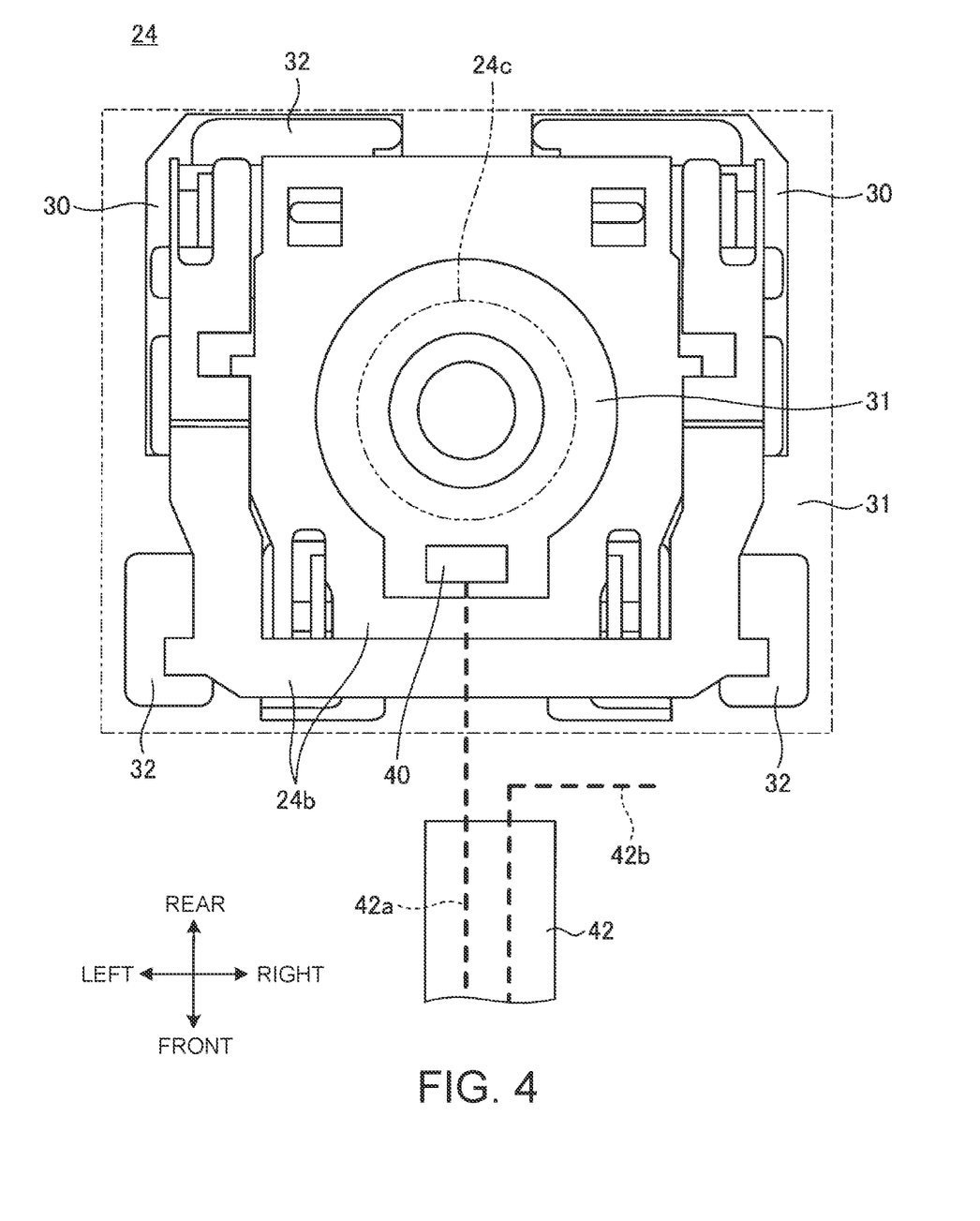
FIG. 4 is a plan view of a key switch provided with an individual light source, a key top thereof having been removed.
Figure 5A:
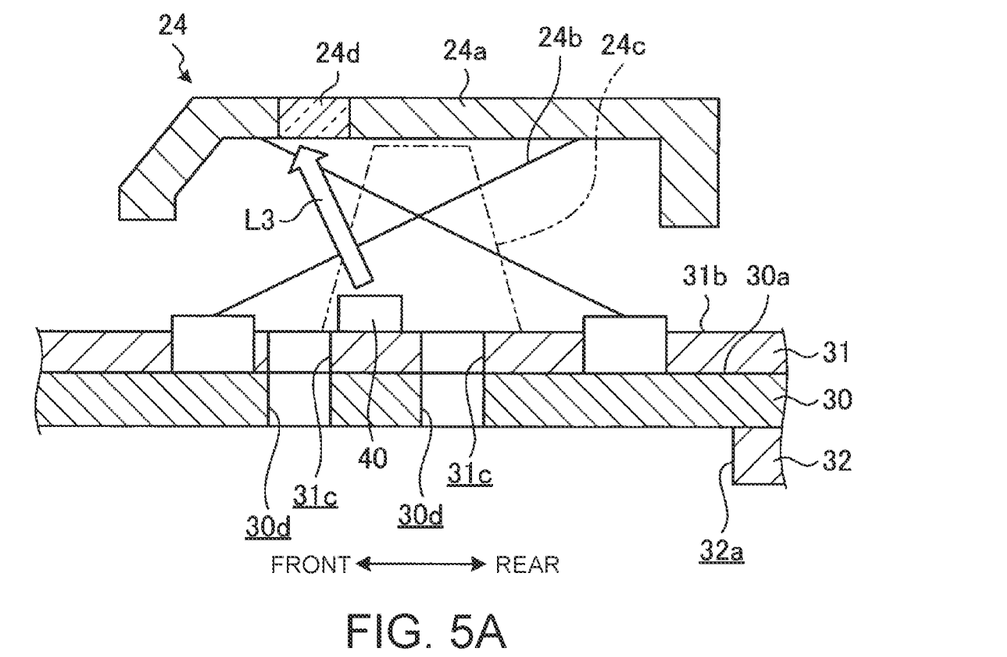
FIG. 5A is a side cross-sectional view illustrating the key switch illuminated using an individual light source and a peripheral part thereof.
Figure 5B:
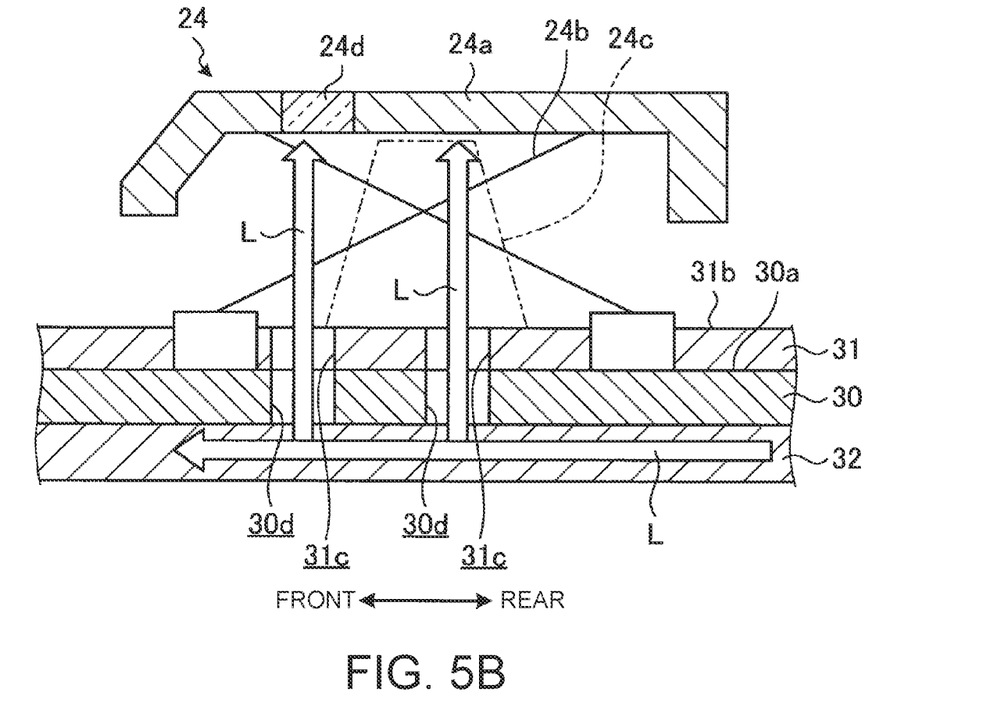
FIG. 5B is a side cross-sectional view illustrating the key switch illuminated using a light guide plate and a peripheral part thereof.
Figure 6:
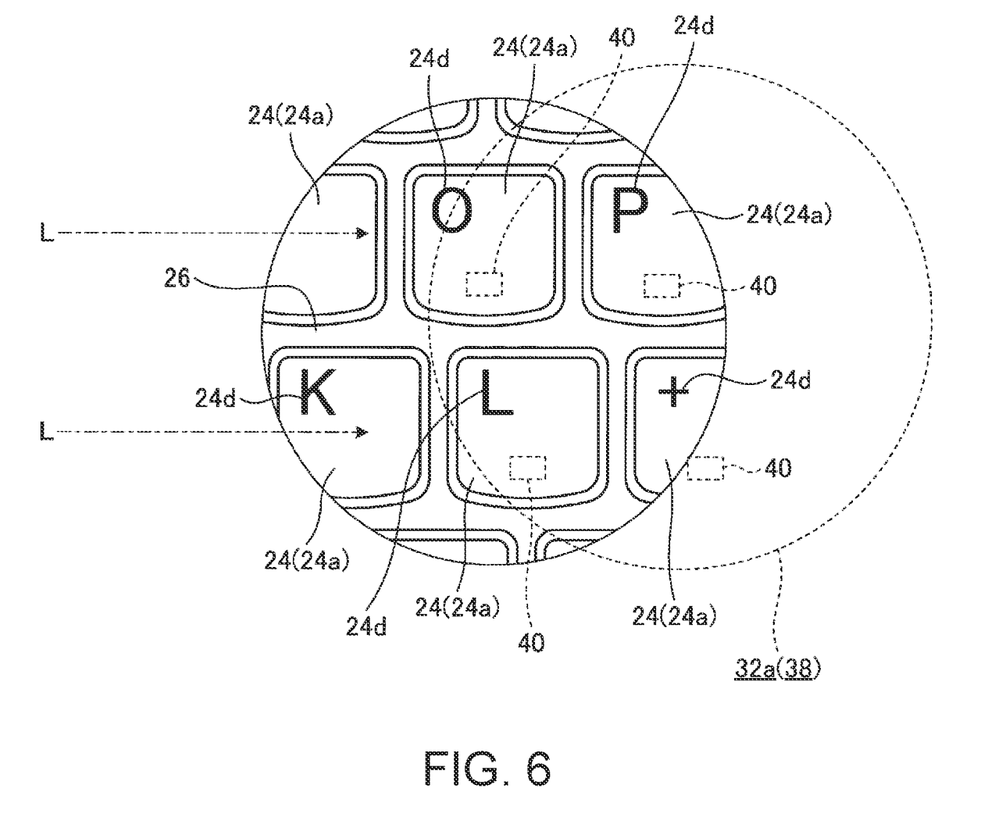
FIG. 6 is an enlarged plan view illustrating a part of the keyboard device.

FIG. 4 is a plan view of the key switch 24 provided with the individual light source 40, the key top 24a thereof having been removed. FIG. 5A is a side cross-sectional view illustrating the key switch 24 illuminated using the individual light source 40 and a peripheral part thereof. FIG. 5B is aside cross-sectional view illustrating the key switch 24 illuminated using the light guide plate 32 and a peripheral part thereof. FIG. 6 is an enlarged plan view illustrating a part of the keyboard device 12.

As illustrated in FIGS. 4 and 5A, the individual light source 40 is mounted on the top surface 31b of the membrane sheet 31 directly under the key top 24a. The individual light source 40 is an LED element, for example. The individual light source 40 is provided directly under the key switch 24 located to overlap the hole 32a (see FIGS. 2, 5A and 6). As illustrated in FIG. 5A, light L3 emitted by the individual light source 40 is transmitted to the top surface side of the key top 24a via a light transmissive part 24d provided in the key top 24a. The light transmissive part 24d is a transparent or translucent resin plate portion provided in a part of the key top 24a. The light transmissive part 24d is, for example, that part of the key top 24a which is formed on a surface thereof as a letter such as an alphabet or a symbol (see FIG. 6).

As illustrated in FIG. 6, the individual light sources 40 are provided to the key switches 24 at least a part of the key tops 24a thereof overlaps the hole 32a. In this embodiment, the individual light sources 40 are provided to the key switches 24 at least a part of the light transmissive parts 24d thereof overlaps the hole 32a. Specifically, in the configuration example illustrated in FIG. 6, the key tops 24a with the letters O, P and L as well as the symbol + are illuminated with the light L3 from the individual light sources 40.

Meanwhile, in the configuration example illustrated in FIG. 6, the letter K, which is located outside the hole 32a, is illuminated with the light L from the light guide plate 32. As illustrated in FIG. 5B, the key top 24a illuminated by the light guide plate 32 is irradiated with the light L from the light guide plate 32 through the holes 31c and 30d of the membrane sheet 31 and the base plate 30 provided directly thereunder. Like the light L3 from the individual light source 40, the light L is transmitted to the top surface side of the key top 24a via the light transmissive part 24d of the key top 24a.

A wiring structure of the individual light sources 40 is now described. As illustrated in FIG. 3, a wiring 42a or 42b is connected to the individual light sources 40. These wirings 42a and 42b are put together in a wiring 42 formed by a flexible substrate or the like and connected to the wiring 34b of the light source module 34 in the midstream thereof to be integral with the wiring 34b and eventually connected to the electronic substrate 21. All the individual light sources 40 may be connected to the wiring 34b by only one wiring 42a, or the individual light sources 40 may be connected to the wiring 34b respectively using wirings 42a.

The individual light sources 40 are thus connected to the electronic substrate 21 via the wiring 34b of the light source module 34. This causes the individual light sources 40 to emit light synchronously with other light sources 34a of the light source module 34. As a result, irrespective of whether the illumination is performed using the light guide plate 32 or the individual light sources 40, all the key tops 24a of the keyboard device 12 are illuminated at the same time in response to a predetermined ON-operation.

Suppose the individual light sources 40 are connected to the electronic substrate 21 not via the wiring 34b but using another dedicated wiring, the wiring 31b of the membrane sheet 31 or the like. Then, in order for the individual light sources 40 to emit light synchronously with the light sources 34a of the light source module 34, a special control program, for example, would be necessary for the CPU 21a or the like to cause the light source module 34 and the individual light sources 40 to synchronously emit light. This results in a complicated control system. Also, since the wirings 42a and 42b of the individual light sources 40 are connected to the electronic substrate 21 in this configuration, the number of connector pins provided on the electronic substrate 21 needs to be changed depending on whether or not the individual light sources 40 are present. This would mean that the configuration of the electronic substrate 21 also needs to be changed depending on whether or not the inlet port 38 is present, which makes it difficult to allow common use of components, thereby increasing component cost.

The electronic apparatus 10, on the other hand, does not use such a special control technique as above. It simply puts the wirings of the individual light sources 40 and the light source module 34 together and still allows all the key tops 24a to be illuminated at the same time. Moreover, connecting the wirings 42a and 42b from the individual light sources 40 to the electronic substrate 21 via the wiring 34b from the light source module 34 allows the electronic substrate 21 to be shared irrespective of presence or absence of the inlet port 38. This expedites common use of components and thus can reduce component cost.

If, for example, the number of components and the cost do not matter, the individual light sources 40 may be connected to the electronic substrate 21 directly via the wirings 42a and 42b. It is then preferable that a control unit such as the CPU 21a mounted on the electronic apparatus 10 controls the light source 34a of the light source module 34 and the individual light sources 40 to synchronously emit light.

As described above, in the electronic apparatus 10 of this embodiment, the keyboard device 12 including the light guide plate 32 has the inlet port 38 for passing air in the top-bottom direction. Moreover, the electronic apparatus 10 includes the individual light sources 40 provided on the bottom surface sides of those key tops 24a that are located to overlap the inlet port 38. This allows all the key tops 24a that require illumination to be illuminated by the light guide plate 32 and the individual light sources 40 even in a part where the light guide plate 32 is made missing due to the inlet port 38.

The electronic apparatus 10 also ensures high cooling performance to be achieved by the inlet port 38 establishing communication in the top-bottom direction in the keyboard device 12. Furthermore, all the key tops 24a that require illumination can be synchronously illuminated by means of the light guide plate 32 and the individual light sources 40. The electronic apparatus 10 uses the individual light sources 40 to illuminate only a part of the key tops 24a. This can significantly reduce production cost compared to the configuration in which all the key tops 24a are respectively provided with the individual light sources for illumination.

In the electronic apparatus 10, as illustrated in FIGS. 3 and 6, the inlet port 38 is sized to have such an opening area that covers a range overlapping at least partially two or more key tops 24a that are adjacent to left and right (for example, the O and P keys and the L and + keys in FIG. 6). At the same time, the inlet port 38 is sized to have such an opening area that covers a range overlapping at least partially two or more key tops 24a that are adjacent to front and rear (for example, the O and L keys and the P and + keys in FIG. 6). This allows the inlet port 38 to ensure a large opening area and thus a large inlet quantity, while surely illuminating the key tops 24a located to overlap therewith by the individual light sources 40.

The present invention is not limited to the foregoing embodiment, and modifications can be freely made without departing from the scope of the present invention.

In the above description, the frame 26 is integrally molded with the cover member 27, and the keyboard device 12 is fixed to the frame 26 from the bottom. The electronic apparatus 10, however, may alternatively be provided with a shallow recessed portion on the top surface 14a of the cover member 27, and the keyboard device 12 may be fixed to the recessed portion from above. In that case, the inlet port 38 may also be configured by a hole like the hole 32a that is provided in the lower surface of the recessed portion of the cover member 27.

As has been described, the present invention provides an electronic apparatus in which the key tops can be illuminated while a cooling function is also in place.

While the invention has been particularly shown and described with reference to a preferred embodiment, it will be understood by those skilled in the art that various changes in form and detail may be made therein without departing from the spirit and scope of the invention.

What is claimed is:

1. An electronic apparatus comprising:
   a chassis; and
   a keyboard device, within said chassis, includes
      a plurality of key switches, wherein a first one of said key switches includes a key top embedded with a light transmissive part;
      a base plate for supporting said plurality of key switches;
      a membrane sheet located on a top surface of said base plate;
      a light guide plate located on a bottom surface of said base plate;
      a light source module for irradiating said light guide plate with light to provide light from said light guide plate to said light transmissive part in said key top of said first key switch via an opening in said base plate and an opening in said membrane sheet; and
      an individual light source located on a top surface of said membrane sheet to provide light to a light transmissive part embedded in a key top of a second one of said plurality of key switches.

2. The electronic apparatus of claim 1, wherein said opening in said base plate is concentric said opening in said membrane sheet.

3. The electronic apparatus of claim 1, wherein said light guide plate is absent in an area directly under said second key switch.

4. The electronic apparatus of claim 3, wherein an inlet port for passing air in a top-bottom direction of said keyboard device is located in said area directly under said second key switch.

5. The electronic apparatus of claim 1, wherein said individual light sources emits light synchronously with said light source module.

6. The electronic apparatus of claim 1, wherein said first key switch further includes a guide mechanism and a rubber dome.

7. The electronic apparatus of claim 1, wherein said second key switch further includes a guide mechanism and a rubber dome.

8. The electronic apparatus of claim 7, wherein said individual light source is located adjacent to said rubber dome.

9. The electronic apparatus of claim 1, wherein each of said base plate and said membrane sheet includes a second concentric opening within an area under said key top of said first key switch.

10. The electronic apparatus of claim 1, wherein each of said base plate and said membrane sheet includes an opening within an area under said key top of said second key switch.

* * * * *